United States Patent
Soderstrom et al.

(10) Patent No.: US 6,471,397 B2
(45) Date of Patent: *Oct. 29, 2002

(54) CASTING USING PYROMETER APPARATUS AND METHOD

(75) Inventors: Mark L. Soderstrom, Fruitport, MI (US); Christopher R. Hanslits, Zuni, VA (US)

(73) Assignee: Howmet Research Corporation, Whitehall, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,981

(22) Filed: Aug. 6, 1999

(65) Prior Publication Data

US 2001/0050942 A1 Dec. 13, 2001

(51) Int. Cl.⁷ .............................. G01K 1/12; G01K 1/08; B22D 27/04
(52) U.S. Cl. .................... 374/139; 374/141; 164/122.1; 164/338.1
(58) Field of Search ................................ 374/139, 121, 374/130, 141, 150; 164/122.1, 122.2, 338.1, 361

(56) References Cited

U.S. PATENT DOCUMENTS

| | | | | |
|---|---|---|---|---|
| 2,397,901 A | * | 4/1946 | Zimmerman | 374/139 |
| 2,519,941 A | * | 8/1950 | Tama | 374/139 |
| 3,115,781 A | * | 12/1963 | Shearman | 374/139 |
| 3,680,625 A | * | 8/1972 | Hein et al. | 164/122.1 |
| 3,745,834 A | | 7/1973 | Veltze et al. | 73/343 R |
| 3,788,382 A | | 1/1974 | Daniel et al. | 164/150 |
| 4,062,399 A | * | 12/1977 | Lirones | 164/338.1 |
| 4,444,516 A | | 4/1984 | Dostoomian et al. | 374/131 |
| 4,522,247 A | | 6/1985 | Ungarean et al. | 164/150 |
| 4,590,987 A | * | 5/1986 | Bailey et al. | 374/139 |
| 4,647,222 A | | 3/1987 | Schultheiss | 374/139 |
| 4,737,038 A | | 4/1988 | Dostoomian | 374/139 |
| 4,813,470 A | * | 3/1989 | Chiang | 164/122.1 |
| 4,969,501 A | * | 11/1990 | Brokloff et al. | 164/122.1 |
| 5,275,227 A | * | 1/1994 | Staub | 164/122.1 |
| 5,289,867 A | | 3/1994 | Barker et al. | 164/455 |
| 5,309,976 A | * | 5/1994 | Prichard et al. | 164/122.2 |
| 5,484,008 A | | 1/1996 | Thompson | 164/338.1 |
| 5,505,247 A | | 4/1996 | Musschoot | 164/76.1 |
| 5,577,547 A | * | 11/1996 | Hosamani | 164/338.1 |
| 5,716,133 A | | 2/1998 | Hosokawa et al. | 374/4 |
| 5,778,961 A | * | 7/1998 | Hugo et al. | 164/122.1 |
| 5,784,426 A | | 7/1998 | Burner et al. | 376/260 |
| 5,931,214 A | * | 8/1999 | Spicer et al. | 164/122.1 |
| 5,951,164 A | * | 9/1999 | Valentin | 374/139 |
| 6,106,150 A | * | 8/2000 | Lindholm et al. | 374/139 |

* cited by examiner

Primary Examiner—Diego Gutierrez
Assistant Examiner—Yaritza Guadalupe

(57) ABSTRACT

Apparatus and method for casting metals and alloys using a pyrometer positioned outside or inside of a casting chamber and relative to a mold heating element in the casting chamber to view a region of a hot melt-filled refractory mold to improve accuracy of the mold temperature readings. The pyrometer is disposed at an elevation outside the casting chamber to view the mold along a viewing path above an induction coil and through an opening in a tubular susceptor disposed about the mold. Alternatively, the tubular susceptor and induction coil both include horizontal openings through which the pyrometer views the melt-filled mold from outside the casting chamber. The pyrometer is positioned to view a uniform profile region of the melt-filled mold having multiple mold cavities as the mold and susceptor are relatively moved.

3 Claims, 3 Drawing Sheets

CASTING USING PYROMETER APPARATUS AND METHOD

FIELD OF INVENTION

The present invention relates to a casting apparatus and process using a pyrometer for viewing a hot melt-filled mold.

BACKGROUND OF THE INVENTION

Pyrometers are commonly used to monitor temperature of hot or molten metal. In attempts to improve the accuracy of the pyrometer reading, various pyrometer positions and viewing areas have been proposed, such as described in U.S. Pat. No. 4,444,516 where a pyrometer probe uses a bundle of optical fibers for determining temperature of molten materials in a high pressure chamber.

U.S. Pat. No. 4,647,222 discloses a pyrometer mounted directly above the center of a melt in a caster.

U.S. Pat. No. 4,737,038 discloses a pyrometer probe for immersion in a molten metal charge.

It is an object of the present invention to provide casting method and apparatus using a pyrometer to view a hot melt-filled refractory mold in a manner to improve temperature measurement accuracy of the melt-filled mold.

SUMMARY OF THE INVENTION

The present invention provides apparatus as well as method for casting metals and alloys using a pyrometer positioned outside or inside of a casting chamber and relative to a mold heating element in the casting chamber to view a region of a hot melt-filled refractory mold to improve accuracy of the mold temperature readings.

In a directional solidification embodiment of the invention, the pyrometer is disposed at an elevation outside or inside the casting chamber to view the mold along a viewing path above an induction coil and through an opening in a tubular susceptor disposed about the mold. In another directional solidification embodiment, both the tubular susceptor and induction coil include openings through which the pyrometer views the melt-filled mold from outside or inside the casting chamber. In these embodiments, the pyrometer is positioned to view a uniform profile region of the melt-filled mold having multiple mold cavities as the mold and susceptor are relatively moved.

DESCRIPTION OF THE INVENTION

DETAILED DESCRIPTION OF THE INVENTION

Figure 1:
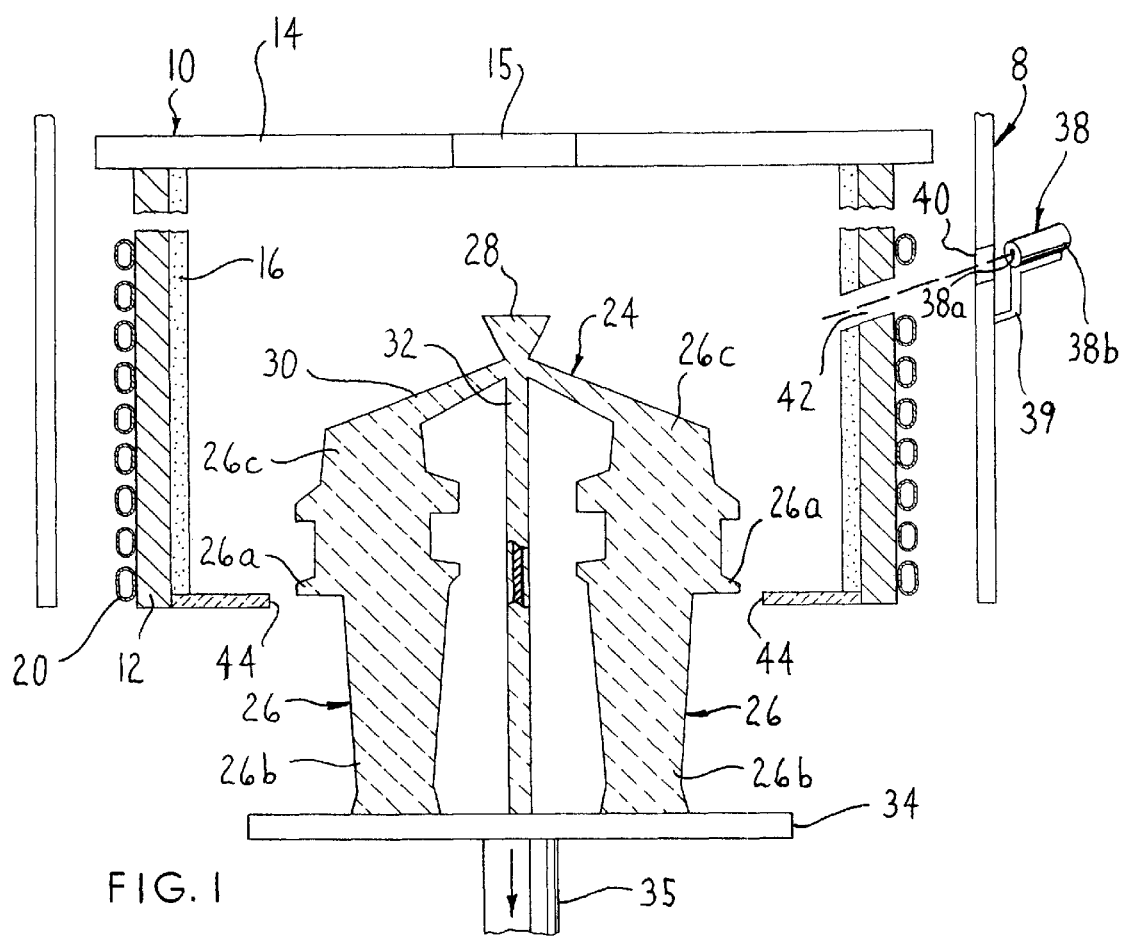
FIG. 1 is a cross-sectional view of a directional solidification casting apparatus in accordance with an embodiment of the invention.

The present invention provides apparatus as well as method for casting metals and alloys using a pyrometer positioned outside or inside of a casting chamber for reading the temperature of a melt-filled ceramic mold that is especially useful for practicing directional solidification casting processes, although the invention can be used in equiaxed and other casting processes. For purposes of illustration only, the invention will be described below with respect to a directional solidification apparatus and process to form columnar grain or single crystal castings. Referring to FIG. 1, casting apparatus in accordance with an embodiment of invention for directional solidification casting of superalloys to produce a columnar grain or single crystal cast microstructure includes a vacuum casting chamber 8 having a casting furnace 10 disposed therein in conventional manner. The furnace 10 comprises a thermal insulation sidewall 12 made of graphite insulation and an upper closure member 14 made of similar material, together forming a furnace enclosure. Positioned within the enclosure is an inner solid graphite tubular member 16 forming a susceptor that is heated by energization of the induction coil 20. The closure member 14 includes an aperture 15 through which molten metal can be introduced into the refractory (e.g. ceramic) mold assembly 24 from a crucible (not shown) residing in the chamber above the casting furnace 10 in conventional manner.

The induction coil 20 is supported on the furnace enclosure adjacent the thermal insulation sidewall 12 and is energized by a conventional electrical power source (not shown). The induction coil 20 inductively heats the tubular graphite susceptor 16 disposed interiorly thereof about the refractory mold assembly 24. The initially empty mold assembly 24 is positioned in the furnace 10 and then preheated to a suitable casting temperature to receive the melt by the heat from the tubular graphite susceptor 16. The mold assembly 24 typically comprises a conventional ceramic investment shell mold formed by the well known lost wax process to include a plurality of peripherally spaced apart shell molds 26, a pour cup 28 that receives the melt from the crucible, gating 30 that conducts the molten metal to the molds 26, and a central shell hollow post 32 that helps support the mold assembly. The shell molds 26 each communicate to a chill plate 34 through an open lower end of the shell molds in a conventional manner to provide unidirectional heat removal from the melt in the molds 26 along the longitudinal vertical axis of the molds 26. In casting single crystal components, a crystal selector (not shown), such as a pigtail, will be incorporated into the molds 26 above the open lower end thereof to select a single crystal for propagation through the melt, all as is well known. The mold assembly 24 may be formed with an integral mold base (not shown) that rests on the chill plate 34 and that can be clamped thereto in conventional manner if desired. The chill plate resides on a ram 35 that is raised and lowered by a fluid actuator (not shown).

In the directional solidification casting of gas turbine engines blades or vanes, as shown in FIG. 1, the individual ceramic shell molds 26 each will have a mold cavity configuration having a relatively large platform region or profile 26a corresponding to the platform portion of the blade or vane to be cast. The mold cavity configuration will have a relatively smaller or narrower elongated airfoil region or profile 26b corresponding to the airfoil portion of the blade or vane to be cast and a root region or profile 26c.

Figure 1A:
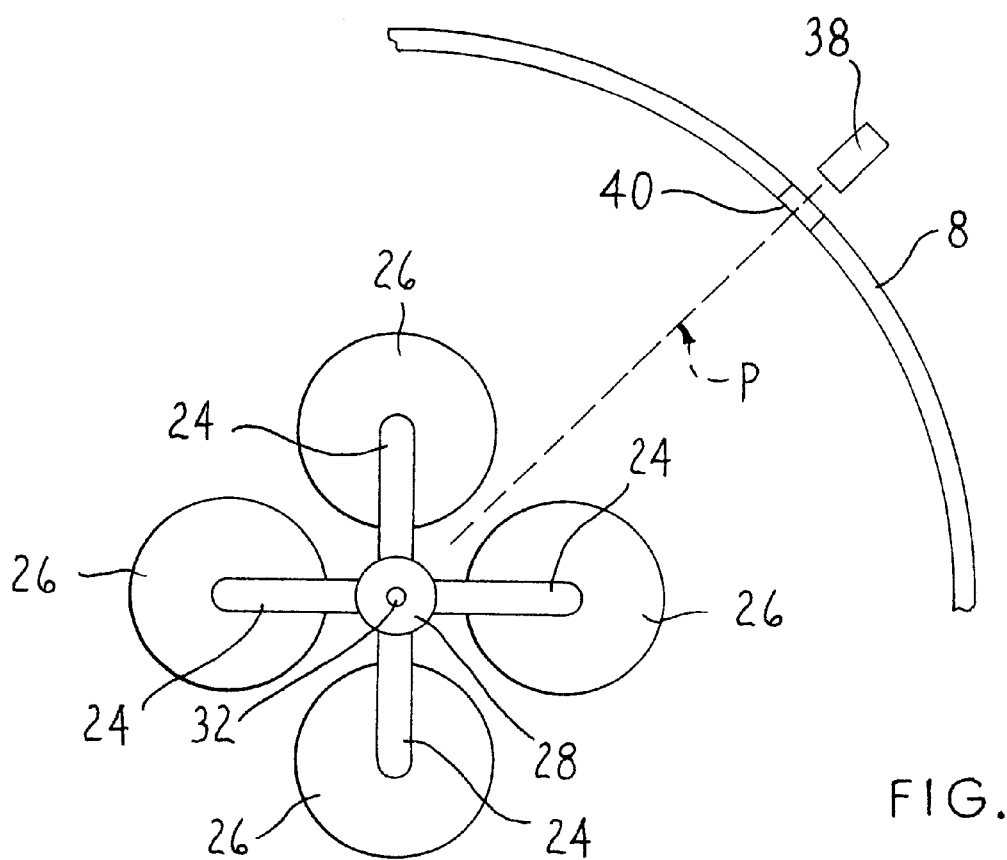
FIG. 1A is a schematic plan view of the mold assembly and the pyrometer.

In accordance with an illustrative embodiment of the invention, a pyrometer 38 is disposed outside of the casting chamber 8 as shown, or inside thereof, at an elevation above the induction coil 20 and views mold assembly 24 through vacuum tight sealed, transparent sight port window 40 in chamber wall 8 and openings or apertures 42 in sidewall 12 and susceptor 16 as illustrated by the dashed line in FIG. 1, for temperature measurement of the hot melt-filled mold assembly 24. Sight port window 40 in chamber wall 8 and openings 42 are positioned and oriented to allow the pyrometer 38 to view the hollow melt-filled center post 32 along a viewing path P between the shell molds 26, FIG. 1A. The hollow melt-filled center post 32 provides a uniform outer profile (cylindrical outer profile) that permits more accurate temperature measurement by the pyrometer 38. The temperature of the molten metal in the hollow center post 32 is representative of that in the shell molds 26. The heating element closure 14 may include a viewing opening to this same end.

The pyrometer 38 includes a viewing body 38a residing in the pyrometer housing 38b to view the temperature of the melt-filled hollow center post 32. The pyrometer housing 38b is supported by a flange 39 outside the casting chamber 8. Cables (not shown) extend from the pyrometer 38 to a computer control unit for the casting furnace 10 to input signals representative of mold temperatures and to allow control of electrical power to the induction coil 20 and/or the rate of withdrawal of the melt-filled mold assembly 24 from the susceptor 16 during directional solidification of the melt in the mold assembly. The mold assembly 24 is withdrawn from susceptor 16 on ram 35 downwardly past a thermal baffle 44 at the open lower end of the casting furnace 10 in conventional manner. A pyrometer 38 for practicing the invention can comprise a conventional temperature-sensing pyrometer available as Land System 3 from Land Infrared, Bristol, Pa.

Figure 2:
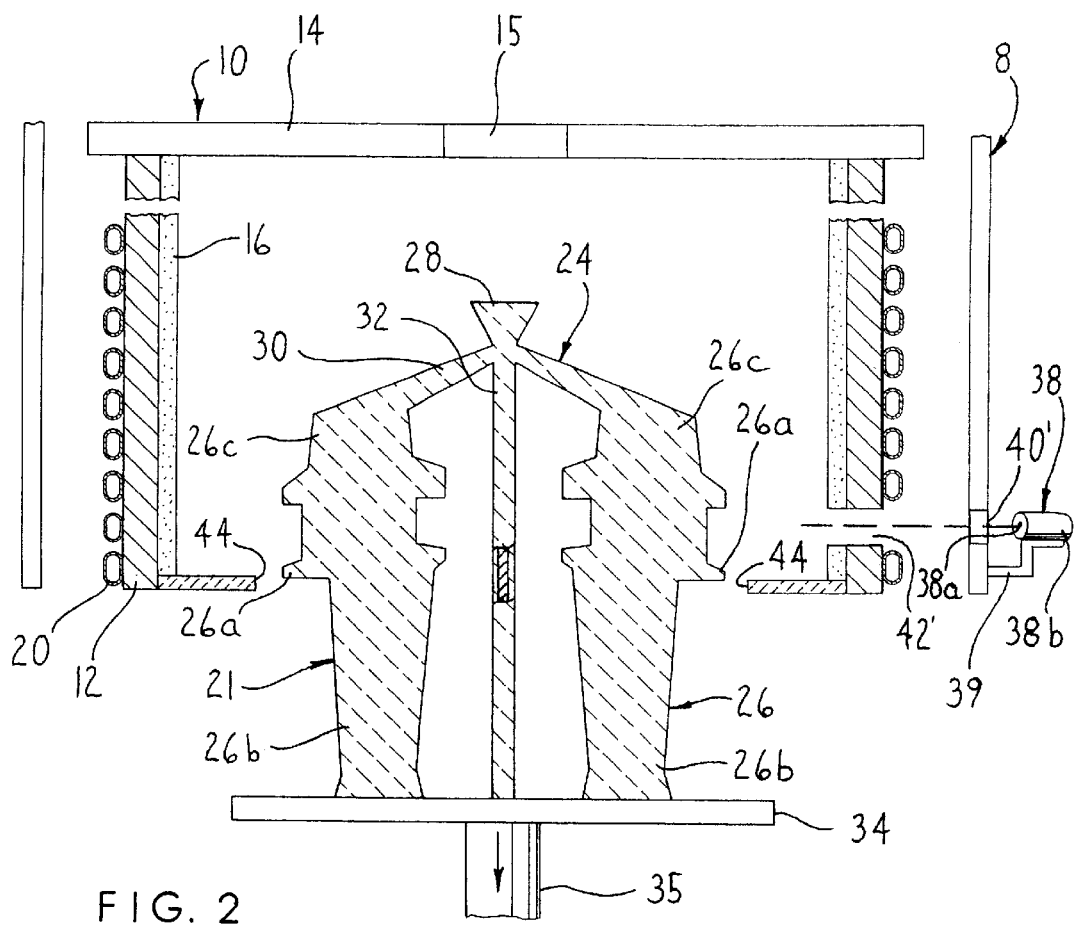
FIG. 2 is a cross-sectional view of another embodiment of the invention.

In an alternative embodiment of the invention, as shown in FIG. 2, a pyrometer 38 is disposed outside of the casting chamber 8 as shown, or inside thereof, and views mold assembly 24 through vacuum tight sealed sight port window 40' and openings 42', as illustrated by the dashed line in FIG. 2, for temperature determination of the hot melt-filled mold assembly 24. The sight port window 40' and openings 42' extend horizontally through chamber 8, and through coil 20, sidewall 12, and susceptor 16. Sight port window 40' and openings 42' allow the pyrometer 38 to view a uniform region or profile of the mold assembly 24, such as the hollow melt-filled center post 32, along a horizontal viewing path between shell molds 26.

The casting method and assembly described hereabove is advantageous to provide more accurate temperature sensing of the hot melt-filled shell molds 26 so as to control electrical power supply to the induction coil 20 and/or withdrawal rate of the mold 24 assembly on ram 35 from the furnace 10 during directional solidification casting processes.

The invention also can be used in production of equiaxed castings in mold assembly 24 residing in furnace 10. It is to be understood that the invention has been described with respect to certain specific embodiments thereof for purposes of illustration and not limitation. The present invention envisions that modifications, changes, and the like can be made therein without departing from the spirit and scope of the invention as set forth in the following claims.

We claim:

1. Casting apparatus, comprising a heating element disposed in a chamber about a hot melt-filled mold comprising a plurality of peripherally spaced apart shell molds disposed about an upstanding post, said heating element having an opening, and a pyrometer positioned outside of said mold to view said upstanding post along a viewing path that extends through said opening and between said peripherally spaced apart shell molds.

2. The apparatus of claim 1 wherein said pyrometer views said post along said viewing path extending between airfoil contoured shell molds.

3. A method of casting, comprising heating a melt-filled mold by a heating element disposed about said mold in a chamber, said mold comprising a plurality of peripherally spaced apart shell molds disposed about an upstanding post, positioning a pyrometer outside of said mold to view said upstanding post of said melt-filled mold along a viewing path extending through an opening in said heating element and between said peripherally spaced apart shell molds, and viewing said upstanding post using said pyrometer to determine temperature thereof.

* * * * *